Apr. 17, 1923.　　　　　　　　　　　　　　　　　　1,452,292
J. L. DONAT
RESILIENT WHEEL FOR VEHICLES
Filed Dec. 26, 1919
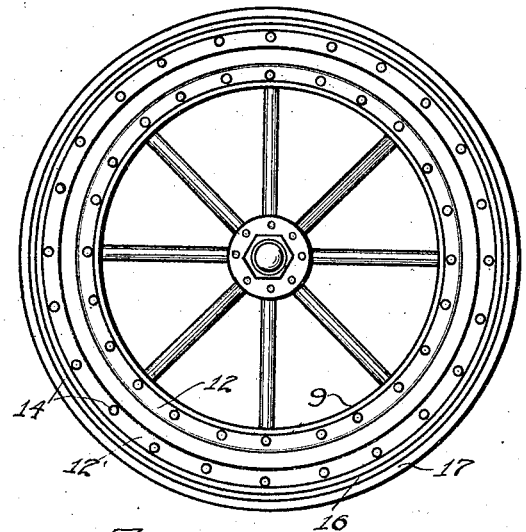
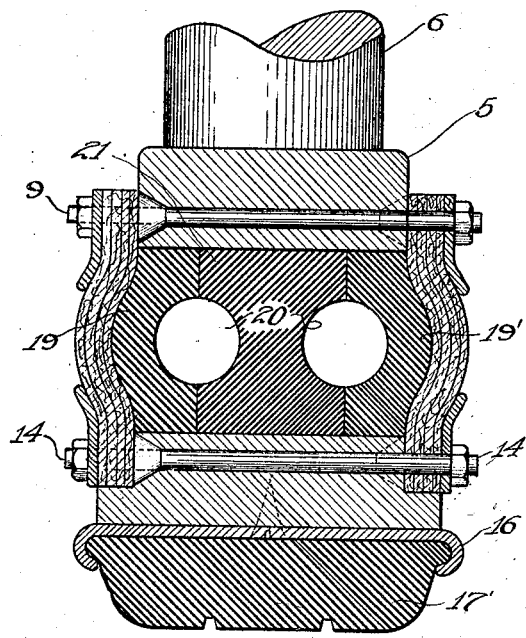
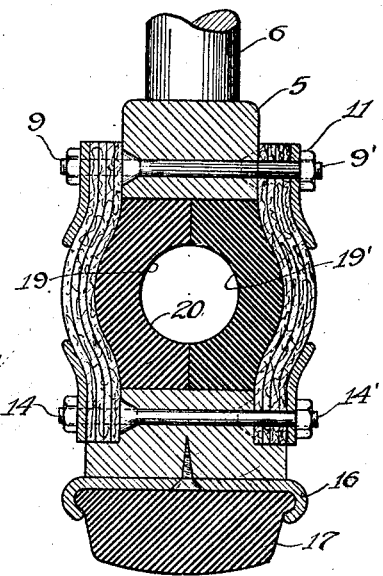
Inventor:
Joseph L. Donat, Patented Apr. 17, 1923.

1,452,292

UNITED STATES PATENT OFFICE.

JOSEPH L. DONAT, OF CHICAGO, ILLINOIS.

RESILIENT WHEEL FOR VEHICLES.

Application filed December 26, 1919. Serial No. 347,258.

*To all whom it may concern:*

Be it known that I, JOSEPH L. DONAT, a citizen of the United States, residing at Chicago, in the county of Cook and State of Illinois, have invented certain new and useful Improvements in Resilient Wheels for Vehicles, of which the following is a specification.

The invention relates to improvements in resilient tires.

One of the objects of the invention is to provide a tire having two radially separated, resilient circumferentially extending members and an intermediate ring to hold both members in place with respect to each other.

Another object of the invention is to provide a two-part casing enclosing a resilient member and a ring surrounding the said inner member to which the two parts of the casing are attached, and a cushion tire carried by said ring member.

A more specific object of the invention is to provide a two-part casing member, each part secured directly to the felly of the wheel and to a radially spaced-apart ring, said ring carrying a cushion tire.

Other, further and more specific objects of my invention will become readily apparent to persons skilled in the art from a consideration of the following description when taken in conjunction with the drawings, wherein:—

Fig. 1 is a side elevation of a wheel having my improved tire thereon.

Fig. 2 is a similar view showing a resilient ring inside of the two-part casing and Fig. 3 is a view similar to that shown in Fig. 3 with three resilient members inside of the two-part casing.

In all the views the same reference characters are employed to indicate similar parts.

5 is the ordinary rim of a wheel to which is connected the spokes 6. The two-part casing is composed of the side members 7 and 8 made preferably of fabric incorporated with rubber. The inner edges of the rings 7 and 8 are both secured to the felly 5 by bolts 9, each of which has a countersunk head 10, so that alternate bolts terminate on opposite sides of the ring to receive the nuts 11. Overlying the parts 7 and 8 are rings 12 to more intimately hold the side members 7 and 8 in contact with the felly. The outer edges of the rings 7 and 8 are both secured to a ring 13 in a similar manner by bolts 14 and 14'. Each of these bolts is provided with a countersunk head in the same manner and terminate on the outside of the rim in alternate relation. The outer surfaces of the bolts 9 and 14 are flush with the inner ring or felly so as not to abrade or injure the surface of the members 7 and 8. Secured to the ring 13 is a clincher rim 16, as by screws 17, or the like, and in the rim is a cushion tire 17.

In Fig. 2, I have shown a resilient member 19 which may be of sponge rubber, or other similar suitable yielding material made in two pieces, 19 and 19', or made in a single piece with an opening 20. For some purposes the cushion member 19 may be used instead of the inner tube 18, the other parts of the wheel remaining the same, or one may be substituted for the other, and in Fig. 3, I have shown a wider tire in which there is an intermediate ring 21 of resilient material, similar to that of which the rings 19 and 19' are composed. When intermediate ring 21 is interposed between the members 19 and 19' there are two openings 20 in a tire of this character. The members 19 and 19' used in Fig. 3 are the same members used in Fig. 2, the difference between the tires being the interposition of the center member 21 to provide for a wider face tire. The members of the wheel shown in Fig. 3 are put together and held in place in the same manner by bolts 9 and 14 but they are somewhat longer because of the extra width of the tire.

The same tire may be used with an inner tube 18 and subsequently may be removed and the members 19 and 19' put in its place, and when it is desired to use the pneumatic tube, the parts 19 and 19' may be carried as spares for replacement in the event of an accident to the pneumatic tube.

Having described my invention what I claim is new and desire to secure by Letters Patent is:—

A resilient tire for a wheel having in combination a felly; a spaced apart outer concentric ring; two flat resilient rings having their inner and outer circumferential edges bolted to the felly and to the outer ring, respectively; two cushion rings of resilient material each having its outer side surface substantially convex and its inner side surface concave, with their concave surfaces confronting, thereby forming a substantially circular, circumferentially extending opening between the cushion rings, said composite cushion ring being within and substantially filling the opening between the felly and outer ring and the two side rings so that the cushion rings and side rings together form a cushion which expands and contracts laterally as a unit under a wheel load; and two reinforcing metal rings on each side of the structure, one pair bolted to the felly and the other pair to the spaced apart ring to limit the lateral movement of the flat resilient rings.

In testimony whereof I hereunto subscribed my name.

JOSEPH L. DONAT.